(12) United States Patent
Katoh et al.

(10) Patent No.: US 6,654,495 B1
(45) Date of Patent: Nov. 25, 2003

(54) METHOD AND APPARATUS FOR REMOVING RULED LINES

(75) Inventors: Shin Katoh, Tokyo (JP); Hiroyasu Takahashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/557,625

(22) Filed: Apr. 25, 2000

(30) Foreign Application Priority Data

Apr. 27, 1999 (JP) .......................................... 11-119315

(51) Int. Cl.$^7$ ................................................ G06K 9/34
(52) U.S. Cl. ...................................... 382/178; 382/257
(58) Field of Search ................................ 382/173–180, 382/254–275; 358/462–468

(56) References Cited

U.S. PATENT DOCUMENTS

| | | | | |
|---|---|---|---|---|
| 5,191,612 A | * | 3/1993 | Katsuyama et al. | 382/175 |
| 5,896,464 A | * | 4/1999 | Horiuchi et al. | 382/178 |
| 5,898,795 A | * | 4/1999 | Bessho | 382/173 |
| 6,141,444 A | * | 10/2000 | Hasegawa | 382/175 |
| 6,434,270 B1 | * | 8/2002 | Ohara et al. | 382/178 |

FOREIGN PATENT DOCUMENTS

| | | | | |
|---|---|---|---|---|
| JP | 405266254 A | * | 10/1993 | G06K/9/34 |
| JP | 09-185726 | | 7/1997 | |
| JP | 410334184 A | * | 12/1998 | G06K/9/20 |
| JP | 411025219 A | * | 1/1999 | G06K/9/20 |

OTHER PUBLICATIONS

Baxes, "Digital Image Processing" 1994 John Wiley & Sons, Inc. p. 127–137.*

1. S. Naoi et al., "Segmentation for Handwritten Characters Overlapped a Border By Global Interpolation Method," The Institute of Electronics, Information and Communication Engineers, Technical Report of IEICE, NLC93–22, PRU93–25, pp. 33–40, Jul. 1993.

* cited by examiner

*Primary Examiner*—Jingge Wu
(74) *Attorney, Agent, or Firm*—Thu Ann Dang

(57) ABSTRACT

Methods and apparatus are provided for removing ruled lines from a binary image containing character portions and ruled line portions, comprising the following steps. First, horizontal black runs in the bit-map image are detected and the detected black runs portions are stored as a run-length table comprising values of the horizontal start point and the length from the starting point of each black run for each vertical position. Then, based on the run-length table, black runs exceeding a predetermined threshold value are removed from the image to remove the ruled line comprising those black runs. Then, residual noise is eliminated from the image after the removal of the ruled lines. Then, in the image after the elimination of the residual noise, vertically disconnected components of a character are connected. Then, a portion of the character which is deleted by ruled line removal process is extracted from the image after the connection of vertically disconnected components of the character. Finally, the extracted portion of the character is interpolated in the image after the removal of the residual noise to restore the portion of the character removed by the ruled line removal process.

24 Claims, 9 Drawing Sheets

SAMPLE IMAGE

IMAGE AFTER THE PROCESS
OF STEP 2

IMAGE AFTER THE PROCESS
OF STEP 3

IMAGE AFTER THE PROCESS
OF STEP 4

IMAGE AFTER THE PROCESS
OF STEP 5

IMAGE AFTER THE PROCESS
OF STEP 6

IMAGE AFTER COMPLETION OF
THE ENTIRE CORRECTION PROCESS

EXAMPLE OF RUN-LENGTH TABLE

| Y-COORDINATE | START POINT ALONG X-AXIS, LENGTH | | | | | |
|---|---|---|---|---|---|---|
| 0 | EOL | | | | | |
| 1 | EOL | | | | | |
| 2 | 13 | 15 | EOL | | | |
| 3 | 10 | 20 | 58 | 21 | 95 | 12 | EOL |
| | ↑ START POINT | ↑ LENGTH | ↑ START POINT | ↑ LENGTH | | |

(A)     (B)
REMOVAL OF BLACK RUN

| 0 | 0 | 0 | up |
|---|---|---|----|
| − | × | − | ct |
| 0 | 0 | 0 | dw |

MASK FOR ELIMINATING
RESIDUAL NOISE (A)  (B)

ELIMINATION OF RESIDUAL NOISE

| SCAN LINE 1 | * | top3 |
|---|---|---|
| 2 | * | top2 |
| 3 | * | top1 |
| 4 | × | ct |
| 5 | * | bot1 |
| 6 | * | bot2 |
| 7 | * | bot3 |

(lines 1–3: OR; lines 5–7: OR)

EXAMPLE OF A MASK FOR CONNECTING
VERTICALLY DISCONNECTED COMPONENTS

CONCEPTUAL VIEW OF CONNECTION BETWEEN
DISCONNECTED CHARACTER COMPONENTS (A) BEFORE CONNECTION   (B) AFTER CONNECTION

EXAMPLE OF CONNECTION OF
VERTICALLY DISCONNECTED COMPONENTS

EXTRACTION OF CHARACTER COMPONENTS DELETED BY RULED LINE REMOVAL (A)　　　(B)　　　(C)

RESTORATION OF CHARACTER PORTIONS ELIMINATED WITH RULED LINE

| 早 | 台 | 番 | 号 |
|---|---|---|---|
| S A R R D － W B T C A D 0 1 4 1 8 9 ||||
| 所有者の氏名又は名称 | 株式会社ケーユー |||
| 所有者の住所 | 東京都町田市鶴間１６７０ |||

EXAMPLE OF ORIGINAL IMAGE

早　台　番　号

S A R R D － W B T C A D 0 1 4 1 8 9

所有者の氏名又は名称　株式会社ケーユー

所有者の住所　東京都町田市鶴間１６７０

EXAMPLE OF IMAGE AFTER REMOVAL OF VERTICAL AND HORIZONTAL RULED LINE

METHOD AND APPARATUS FOR REMOVING RULED LINES

FIELD OF THE INVENTION

The present invention relates to a method and apparatus for removing ruled lines from an image containing ruled lines and characters at high speed.

BACKGROUND OF THE INVENTION

Recently, in optical character recognition (OCR), limitations on characters and forms that can be entered in an OCR apparatus have been increasingly relaxed. For example, there is a growing need for cutting out handwritten characters filled in black frames, or for processing characters written on forms that are originally not provided for processing by an OCR apparatus. As an example, methods for removing ruled lines from an image containing ruled lines and other image components such as characters have been proposed. By way of example, "forms processing" is performed as described below.
1. Forms Processing:

There is an intense demand for processing existing business forms by OCR without making any change to them. Because, on such a form, the borders of character entry fields are printed as thin black lines and there is no clear area between those lines, a contact or an intersection between the borders and characters often occurs. To address this problem, a method is known in which a blank form is registered in advance, a filled form is superimposed on it, and matched image patterns of the both forms are removed as background images from the image. This method, however, has problems that it requires time and efforts for pre-registration of blank forms and that deleted character components cannot be interpolated after ruled line portions are removed.

As methods for solving the above-mentioned problems, the Global Interpolation Method (GIM) and a method for removing ruled lines which is disclosed in Published Unexamined Patent Application No. 9-185726 are known.
2. High-quality Segmentation of Characters Overlapping a Border by the GIM:

Naoi et al. proposes the GIM which interpolates a missing pattern by a global evaluation of geometrical information and topological structure in "Segmentation for Handwritten Characters Overlapped a Border by Global Interpolation Method" (by Naoi, Yabuki et al., IEICE Technical Report, NLC92-22, PRU93-25, pp. 33–40, July, 1993). In the GIM, missing patterns are interpolated to connect the discontinued patterns. The interpolated patterns are provided to a recognition and post-processing system as candidate patterns and the position and size of these candidate patterns are globally evaluated to correct the interpolated region. The topological structure such as connectivity in the corrected interpolated region is evaluated and the re-interpolation of the missing pattern is repeated to produce candidate patterns in sequence, which candidate patterns are provided to the recognition and post-processing system in sequence until a predetermined topological structure is obtained.
3. Method for Removing Ruled Lines Disclosed in Published Unexamined Patent Application No. 9-185726:

In this method, first, the information about the position of ruled lines in a form image in image memory is stored in ruled line position storing memory. A ruled line deleting means uses this stored ruled line position information to remove ruled lines in the form image in the image memory and stores the coordinate value indicating the position of disconnection of a character component caused at interference between the character and the ruled lines in the process of the removal of the ruled lines. Then, a character restoring means analyzes graphics structure of the form image in the vicinity of the disconnection based on ruled line position information in the ruled line position storing memory, the coordinate value indicating the disconnection position in the disconnection position storing memory, and a reference to the form image in the image memory. Finally, an interference pattern between the character and the ruled line produced at the disconnection position is estimated based on the analysis and the missing portion of the character is restored based on the estimation, thus the ruled line removal is completed.

The GIM described above provides a good interpolated image since it simulates the mechanism of human pattern interpolation by taking the product of the psychological studies into consideration. However, the method uses many processes that take a large amount of load for implementation by software, such as labeling and thinning of black pixel components and detecting outline vector directions. Therefore, the method has a problem that it cannot remove a ruled line and restore a missing portion of a character produced by intersection with the ruled line at high speed. The method disclosed in Published Unexamined Patent Application No. 9-185726 also has a problem that, like the GIM, it cannot remove ruled lines at high speed because it involves storing ruled line position information in the ruled line position memory beforehand, and during removal of ruled lines, detects a disconnection in a character component at which the character and the ruled line intersect, and provides heuristic evaluation criteria for restoring connection of disconnected positions. In addition, in this method, the types of characters are restricted to those that are constructed with a small number of strokes because the number of combinations of heuristic evaluation determinations increases as the number of disconnections increases.

SUMMARY OF THE INVENTION

It is an objective of the present invention to provide a method and apparatus for removing ruled lines at high speed and restoring a portion at which a character and a ruled line intersect each other and which is removed by the removal of the ruled line at high speed, by simply performing AND/OR operations on the entire image without specially storing disconnected position information.

The present invention relates to a method for removing ruled lines from a bit-map image containing character portions and ruled line portions, which may comprise the following steps. First, horizontal black runs in the bit-map image are detected and the positions of the detected black runs are stored as a run-length table comprising values of the horizontal start point and the length from the starting point of each black run at each vertical position. A "black run" in the present invention means a continuous sequence of black pixels running in a scanning direction. Then, based on the run-length table, black runs longer than a predetermined threshold value are removed from the image to remove the ruled line. The length of a black run from its start point may also be obtained by storing the start point and the end point, instead of the length itself. Then, in the image after the ruled lines are removed, vertically disconnected components of a character are connected. Then, a portion of the character which is deleted by the ruled line removal is extracted from the image after the connection of vertically disconnected components of the character. Finally, the extracted portion of the character is interpolated in the image from which ruled lines have been removed to restore the portion of the character removed by the ruled line removal. In the present invention, the concept of an "image after ruled line removal" includes not only the image from which ruled lines have been removed, but also the image to which certain transformation has been applied after the removal of the ruled lines. The same applies to an "image after vertical disconnected components are connected."

The present invention also relates to an apparatus for removing ruled lines from an image containing ruled line portions and character portions at high speed. A ruled line removing apparatus according to the invention may comprise a black run detecting unit for detecting black runs of horizontal ruled lines in an image and storing the detected black runs in a run-length table comprising values of the horizontal start point and the length from the start point of each of the detected black runs at each vertical position at which the black run is detected, a line segment writing unit for removing black runs longer than a predetermined value, a mask processing unit for connecting vertically disconnected components, and an AND/OR operation unit for performing an AND or OR operation between images on a pixel basis.

According to the invention described above, the entire ruled line removal process can be performed at high speed by the steps of removing ruled lines using a run-length table, eliminating residual noise, connecting vertical disconnected components, and interpolating and restoring only the portion of a character that is deleted by the removal of the ruled lines, because most of these steps are accomplished by AND/OR operations which can be performed at a remarkably high speed even by a general purpose CPU. In addition, even if a ruled line intersects a character, the intersection which is removed by the removal of the ruled line can be restored uniformly and quickly regardless of the complexity of the shape of the character.

In a preferred embodiment, at first, the removal of ruled lines is ensured by performing the steps of removing residual noise of the ruled line after ruled lines are removed and before vertically disconnected components are connected. In addition, the recognition rate of OCR can be increased by applying this step to the OCR technology. This step is not essential in an embodiment of the present invention. For example, the removal of ruled lines can be ensured by removing black runs that do not exceed a threshold but are vertically adjacent to a black run exceeding the threshold, together with the black run exceeding the threshold, and the recognition rate of OCR can be increased by applying this step to the OCR technology without removing residual noise. Next, a run-length lookup table is used to create a run-length table. In particular, a black run contained in a ruled line is detected when creating a run-length table, by reading pixels horizontally, eight pixels as a unit in sequence based on a run-length lookup table comprising bit patterns, each of which represents a 1-byte numeric value of 0 to 255 assuming that the ruled line portion is a collection of black pixels or bit values of "1," start-point run-length values obtained for each bit pattern, each of the values represents the length of a sequence of black pixels continuing from the least significant bit ($2^0$ bit) to the left, and end-point run-length values obtained for each bit pattern, each of the values represents the length of a sequence of black pixels continuing from the most significant bit ($2^7$ bit) to the right, then using the read eight pixels as a numeric value in said run-length lookup table to obtain the start-point run-length value and the end-point run-length value, then, obtaining the horizontal start point and the length from the start point based on the obtained start-point and end-point run-length values. This example also provides a higher processing speed.

In an alternative embodiment, ruled lines are removed by, assuming that a ruled line is a collection of black pixels or bit values "1," writing a white line segment or values "0" on a black run longer than a predetermined threshold based on the run-length table described above. In addition, when removing ruled lines in a image, if the portion of the image to be removed is a character, a threshold value is set at a value, for example, 1.5 to 2 times the width of the character. Residual noise is eliminated by AND/OR operations using a 3×3 mask comprising the pixel to be eliminated and eight pixels surrounding that pixel. Vertical disconnected components are connected by AND/OR operations using a mask comprising the subject pixel and pixels adjacent to the subject pixel in the vertical direction, for example, three pixels above and three pixels below that pixel. The extraction of a character portion that is deleted in the ruled line removal process is performed by an AND operation between the image resulting from the connection of the vertically disconnected components and an image resulting from restoration of the deleted ruled line. The character portion is restored by an OR operation between the image resulting from the AND operation mentioned above and the image after removal of residual noise. In all of these cases, the process can be performed at higher speed. In addition, a vertical line can also be removed by rotating by 90 degrees and applying said ruled line removal method to the rotated image.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 11A shows the image before the removal of black runs;

FIG. 11B shows the image after the removal of black runs;

FIG. 13A shows the image before the elimination of residual noise shown in FIG. 11B;

FIG. 13B shows the image after the elimination of residual noise;

FIG. 18A shows the image after the AND operation shown in FIG. 17C;

FIG. 18B shows the image after the removal of ruled line shown in FIG. 13B;

FIG. 18C shows the image after an OR operation between the images in FIG. 18A and FIG. 18B;

DETAILED DESCRIPTION OF PREFERRED EMBODIMENTS

Figure 1:
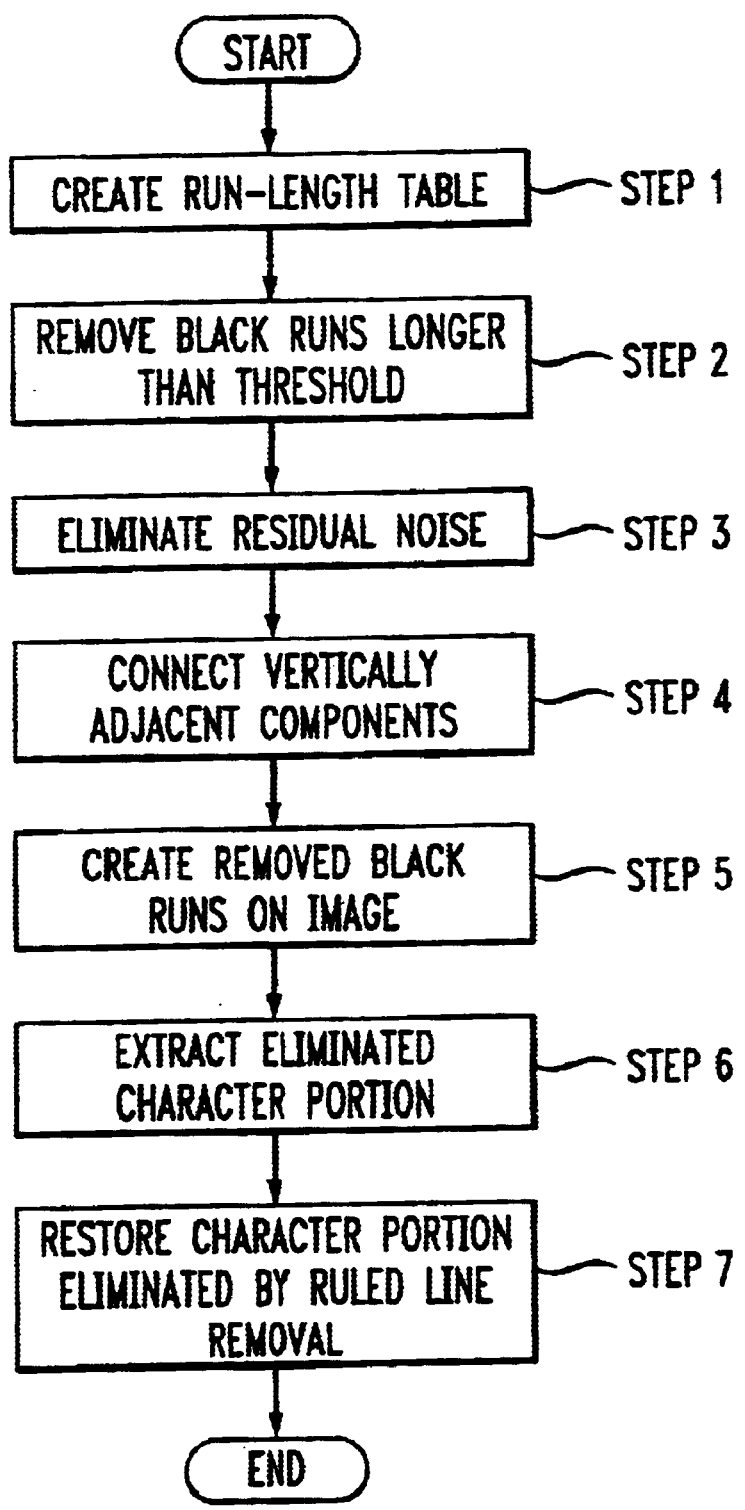
FIG. 1 shows a flowchart for explaining an example of the method for removing ruled lines according to the present invention.
Figure 2:
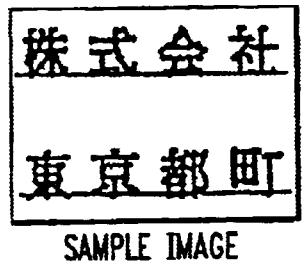
FIG. 2 shows an example of an input image to be processed by the present invention, which is read by a scanner.

FIG. 1 shows a flowchart describing an example of a method for removing ruled lines according to the present invention. One example of the ruled line removal method of the present invention is briefly described below step by step. In this example described herein, a ruled line is considered to be a sequence of black pixels and one black pixel is represented by a bit value "1." A sample image for explanation read through a scanner is shown in FIG. 2.

Step 1: Detection of Black Runs and Creation of a Run-length Table

A black run (a portion where successive black pixels run horizontally) is detected in an image region and a run-length table comprising values of the horizontal start points and the length from the start points is created for each horizontal position to store the position of the detected black run.

Step 2: Removal of a Black Run Longer Than a Threshold Value

Figure 3:
FIG. 3 shows an example of the image after black runs exceeding a threshold value are removed.

Black runs longer than a threshold value are selected from the run-length table created at step 1 and the black runs are removed from the image shown in FIG. 2. The removal of the black runs is performed by writing a white line segment (writing 0s) on appropriate black runs. The threshold value is preferably a value 1.5 to 2 times larger than the width of a character contained in the image. FIG. 3 shows the image after step 2 is performed.

Step 3: Removal of Residual Noise (Optional, Preferred Example)

Figure 4:
FIG. 4 shows an example of the image after residual noise is removed.

The image of ruled lines read by a scanner is not always straight. It contains jagged portions at its edge. Straight-line portions are removed at step 2, but the jagged portions remain. The jagged portions are shown in FIG. 3. At step 3, these portions are removed by performing a 3×3 mask process at high speed. This mask process can be accomplished simply by AND/OR operations as will be described in detail below. FIG. 4 shows the image after the process of step 3.

Step 4: Connection Between Vertically Disconnected Components

Figure 5:
FIG. 5 shows an example of the image after vertically disconnected components are connected.

If a ruled line overlaps with a character, the character is divided into two, the upper and lower components, by the removal of the ruled line (black run). Here, the two components that possibly have resulted from the division in vertical direction are tentatively connected. This process is performed simply and quickly by a mask process using AND/OR operations without any strict check concerning connectivity of the two components that is difficult to perform. Pairs of components that meet a specified criterion and are actually not required to be connected may be connected at step 4. Such excessive connections cause no problem because they will be removed at a later step. FIG. 5 shows the image after the process of step 4. As shown in this figure, excessive connections are produced in positions where upper and lower black pixels are close to each other in characters.

Step 5: Reproduction of Removed Black Runs on Image

Figure 6:
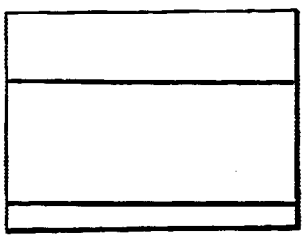
FIG. 6 shows an example of the image after the removed black runs are reconstructed.

Black runs removed at step 2 are reproduced on an image having the same size as an input image shown in FIG. 2. FIG. 6 shows the image after the process of step 5.

Step 6: Extraction of Character Portion Deleted at Step 2

Figure 7:
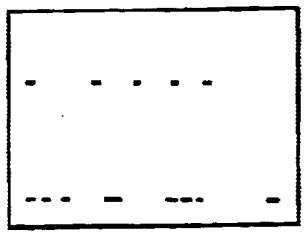
FIG. 7 shows an example of the image after eliminated character components are extracted.

Black pixels in a character portion deleted at step 2 are extracted by an AND operation between the images produced at steps 4 and 5 pixel by pixel. Excessive connections resulting from the process at step 4 are ignored by this process of step 6 and only the character portions that were removed because of overlapping with the ruled line will remain. FIG. 7 shows the image after the process of step 6.

Step 7: Restoration of Character Portion Deleted by Ruled Line Removal

Figure 8:
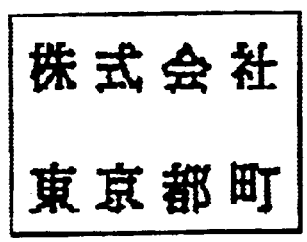
FIG. 8 shows an example of the image after the restoration of character portions eliminated by the removal of ruled lines.

The "ruled-line-removed image" produced at step 3 and the "black pixels deleted from the character portion" extracted at step 6 are combined by an OR operation between them pixel by pixel to restore the deleted portion on the ruled line. FIG. 8 shows the image after the process of step 7.

The outline of the method for removing ruled lines according to the present invention has a been provided above. Detail of the above steps and other steps will be described below under the headings of (1) detection of black runs, (2) removal of black runs longer than threshold, (3) elimination of residual noise, (4) connection between vertically disconnected components, (5) cats extraction of character portion deleted by ruled line removal, (6) restoration of character portion deleted by ruled line removal, (7) removal of vertical ruled line, and (8) handling of skews and blurred spots.

1. Detection of Black Runs

Detection of black runs in an image shown in FIG. 2 can be accomplished by accessing pixels running in a horizontal direction on a line in image memory, one byte or eight pixels at a time, and using a run-length lookup table which is provided in advance assuming a data array of eight pixels to be a numerical value. For example, a run-length lookup table provided with fields "numerical value," "bit pattern," "start-point run-length (RL) value," and "end-point RL value" for 256 entries (patterns of one byte) can be used to find black runs easily as will be described in detail below. Here, the start-point RL value represents the length of a black run continuously running from the least significant bit (LSB: $2^0$ bit) to the left and the end-point RL value represents the length of black run continuously running from the most significant bit (MSB: $2^7$ bit) to the right. It is assumed that each bit in one byte corresponds to each pixel in such a manner that the MSB is placed at the leftmost position and the LSB is placed at the rightmost position. The numerical values and bit patterns in Table 1 are provided for illustration purpose only and actually are not required. The accessed data array of eight pixels (the "bit pattern" in Table 1) is assumed to be a binary number (the "numerical value" in Table 1) and used as an index, thus, the run-length lookup table can be directly referenced to allow for high speed process.

TABLE 1

Run-length lookup table

| Numerical value | Bit pattern | Start-point RL value | End-point RL value |
|---|---|---|---|
| 0 | 00000000 | 0 | 0 |
| 1 | 00000001 | 1 | 0 |
| ... | ... | ... | ... |
| 6 | 00000110 | 0 | 0 |
| 7 | 00000111 | 3 | 0 |
| 8 | 00001000 | 0 | 0 |
| ... | ... | ... | ... |
| 239 | 11101111 | 4 | 3 |
| 240 | 11110000 | 0 | 4 |
| 241 | 11110001 | 1 | 4 |
| ... | ... | ... | ... |
| 255 | 11111111 | 8 | 8 |

An exemplary pseudo-coding is shown in Table 2 below, which shows a procedure for detecting black runs using the above-described run-length lookup table. In the pseudo-coding, error handling and handling of exceptions such as a scan line ending up with a black pixel are omitted for simplicity. It is also possible that, when writing detected black runs into the run-length table, only those black runs which exceed a threshold value are written into the table. If all of the detected black runs are written in the run-length table, it would be convenient that only those black runs which exceed a threshold are flagged. Furthermore, detection of short black runs in which both the MSB and LSB are "0" and whose start-point and end-point are included in the same byte is also omitted. This method is based on memory accesses and table lookup operations on the run-length lookup table, enabling high speed processing.

TABLE 2

An exemplary pseudo-coding
while (processing repeated for the height of image) {
   black run length = 0
   black detection flag = OFF
   access first byte in scan line
   while (repeat for each byte in one scan line) {
     if (black detection flag = OFF) {
       if (start point RL value corresponding to accessed value ≠ 0) {
         black run length = start point RL value
         hold coordinate value of start point
         black detection flag = ON
       }
       else/*Nop*/

TABLE 2-continued

}
     else {
       if (end point RL value corresponding to accessed value ≠ 8) {
         black run length = black run length + 8
       }
       else {
         black run length = black run length + corresponding end point value
         write black run length and start point value held into table
         black detection flag = OFF
         if (start point RL value corresponding to accessed value ≠ 0) {
           black run length = start point RL value
           hold coordinate value of start point
           black detection flag = ON
         }
       }
     }
     access next byte on scan line
   }
}

Figure 9:
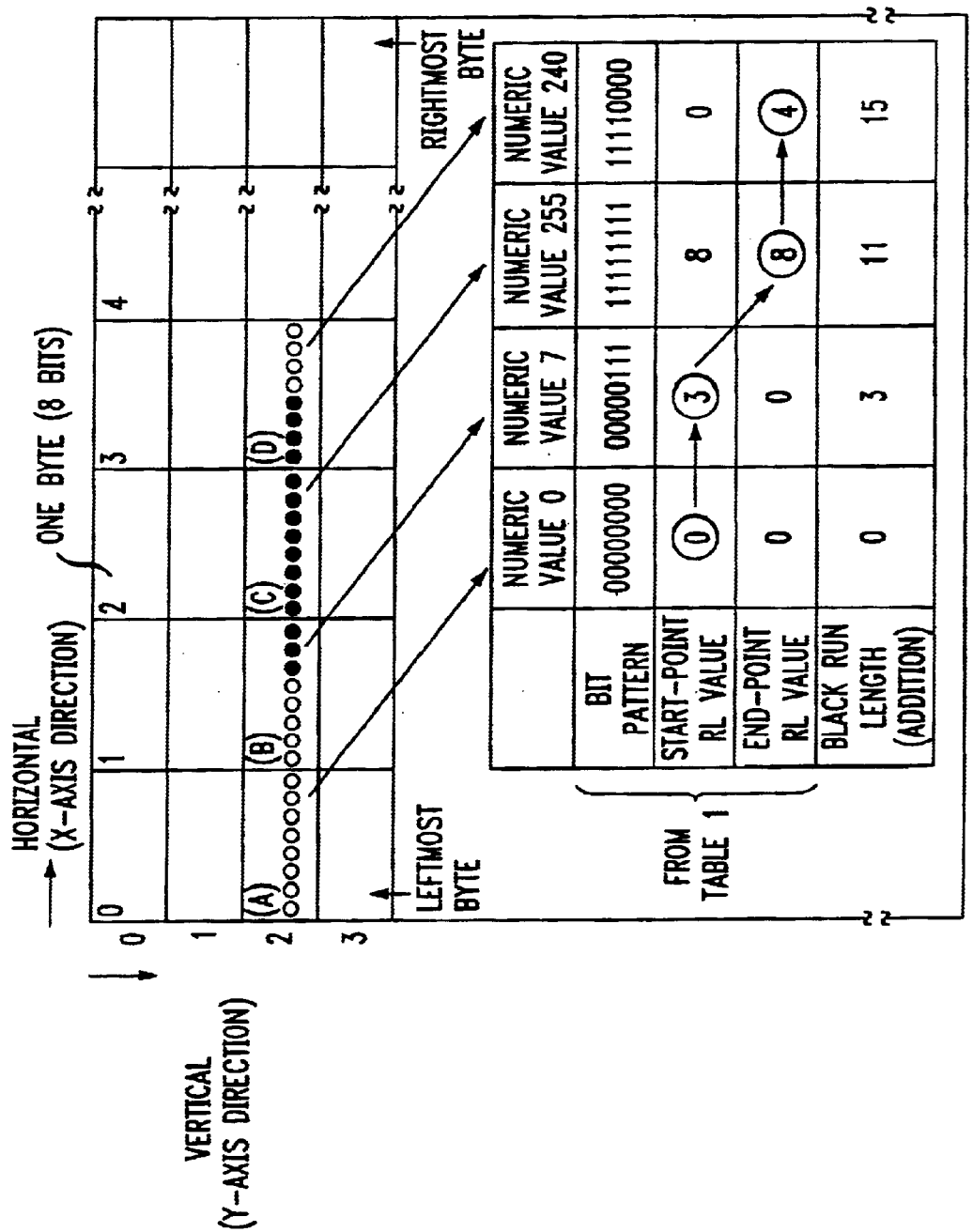
FIG. 9 is a diagram for explaining the state of the image in the image memory, and the method for obtaining black runs by using a run-length lookup table.

A method for detecting black runs according to the pseudo-coding shown in Table 2 is described specifically below. FIG. 9 is a diagram for explaining the state of an image in image memory and the method for obtaining black runs using a run-length lookup table to detect black runs. In FIG. 9, the scan sequence in detecting black runs is as follows. First, at line 0 in the vertical (y-axis) direction, scanning is made in the horizontal (x-axis) direction from the leftmost byte to the rightmost byte, one byte (8 pixels) as a unit. Then, when the rightmost byte is reached, the similar horizontal scanning is performed on line 1, which is next to line 0 in the vertical direction (y-axis). This process is repeated until the last line in the vertical (y-axis) direction is reached, then the scanning process terminates. The method for detecting black runs in the pixels in the first four byte of line 2 shown in FIG. 9 is as follows.

(1) The start-point RL value and the end-point RL value in Table 1 are obtained from the pixel array in memory (A). Here, since the start-point RL value=0, the process goes to the next byte.

(2) Similarly, the start-point RL value and the end-point RL value are obtained from the pixel array in memory (B). Here, since the start-point RL value=3, the start point of the black run is detected as follows.

(a) Black run length=3 is set.

(b) The x-coordinate value of the start point=i×8+(8−start-point RL value (in this case, 3)), where "i" is a byte offset value in the x-axis direction in that memory. For example, i=1 in memory (B), i=0 in memory (A), i=2 in memory (C) . . . and so on. In this example, start point=1×8+(8−3)=13 (assuming that the leftmost position is 0).

(c) The black detection flag is set to ON. Here, it is assumed that the start-point RL value is referenced when the black detection flag is OFF and the end-point RL value is referenced when the black detection flag is ON. The default value of the black detection flag is OFF.

(3) Since the black detection flag=ON in memory (C), the end-point RL value is referenced. In this example, the end-point RL value is "8," therefore the black run length is 3+8=11. The black run continues in memory (C), the black detection flag remains ON and the process goes to the next byte.

(4) The black detection flag=ON in memory (D), the end-point RL value is referenced. In this example, the end-point RL value is "4," therefore the black run length is 3+8+4=15. Because the end-point RL value is not "8," it is indicated that the black run ends here, and the start point and the length of the black run obtained are written in the run-length table. The values to be written are obtained black run start-point=13 and the length=15. Then, the black detection flag is set to OFF.

Figures 10, 11:
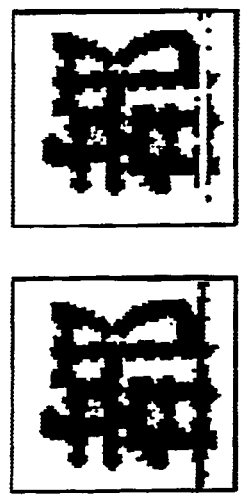
FIG. 10 shows an example of the construction of a run-length table used in the present invention.

FIG. 10 shows an example of the construction of the run-length table used in the present invention. In this example shown in FIG. 10, the number of black runs in one scan line is variable, therefore the horizontal length of the table is variable. An End of Line (EOL) mark (for example, value: −1) is used to indicate the table. If more than one black run is contained in one scan line, the start-point RL values and the length values are successively written in sequence, as shown for the y-coordinate=3. On the contrary, if no black run is contained in a scan line, an EOL is written from the beginning as shown for y-coordinate=0.

(5) The process proceeds according to the pseudo-coding shown in Table 2, thus, all the black runs can be detected except short (6 pixels or less) ones whose start point and end point are included in the same byte. In this respect, the pseudo-coding shown in Table 2 deals with the case where, a black run ends and the next black run starts within one byte. Handling of the case where black pixels continue until the LSB of the rightmost byte is omitted in Table 2 for simplicity.

By performing steps (1) to (5), almost all black runs can be detected.

2. Removal of Black Runs Longer Than Threshold

With the results of the black run detection being stored as start point values and length values in the run-length table as described above, black runs longer than a predetermined threshold can easily be removed by drawing a white line segment in the original image. The method for drawing the white line segment is known and therefore will not be described herein in detail. This process can be performed at high speed by an AND operation or zero clear on a CPU processing word basis.

It is desirable that a value, for example, 1.5 to 2 times larger than the width of characters contained in the image is selected as the threshold value. A proper threshold value should be chosen. If the threshold value is too small, a horizontal stroke may be removed, and if it is too long, ruled lines cannot be detected in a skewed image. FIG. 11A shows the image before black runs are removed and FIG. 11B shows the image after black runs are removed. The figures are part of an image and black runs continue to the outside of the figures. A value 1.5 times larger than the width of characters is chosen as the threshold value. In this example, the average width of characters can be easily known by a process such as creating a histogram in which the vertical axis represents black pixels in the area of interest.

3. Elimination of Residual Noise

Figures 12, 13, 14:
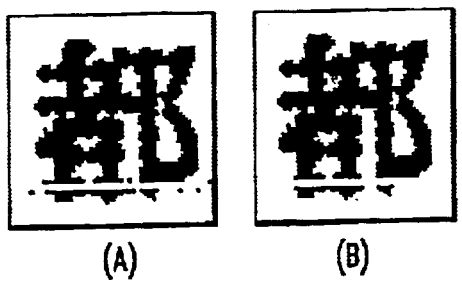
FIG. 12 shows an example of a mask for eliminating residual noise.
FIG. 14 shows an example of a mask for connecting vertically disconnected components.

Images acquired by an image scanner include jagged portions even in a ruled line portion that should actually be straight line. Because these jagged portions are usually within a range of ±n pixels, residual noise after black runs are removed often has a horizontally long shape with a-height of n or less. If n=1, for example, this noise can be easily removed using a 3×3 mask as shown in FIG. 12. In the mask in FIG. 12 used for removing residual noise, "0" indicates that the pixel is "0" (white pixel), "−" indicates "don't care," and "x" indicates the pixel subject to the determination of whether retention or elimination. If the mask in FIG. 12 matches the pixel subject to the determination, the pixel is made to be 0 to eliminate the noise. For the method of applying the above-mentioned mask to all the pixels in the image to eliminate noise at high speed, refer to Japanese Patent Application No. 8-42302. This method is not limited to a 3×3 mask. This method is easily extendible to a 4×4 mask to detect and eliminate residual noise when n=2 in the above example.

A process using a 3×3 mask when n=1 is described below. In FIG. 12, the top line, central line, and bottom line are assigned to multi-bit-length registers (variables) up, ct, and dw, respectively, and data for corresponding one scan line is loaded into the respective registers. Then, four multi-bit-length registers ur, ul, dr, and dl are defined and the following data are loaded into the respective registers:

$$ur = up << 1$$
$$ul = up >> 1$$
$$dr = dw << 1$$
$$dl = dw >> 1$$

(where "x<<1" represents shifting x by one bit to the left, and "x>>1" represents shifting x by one bit to the right). By the operation:

$$ct=ct\&(ul|up|ur|dl|dw|dr)$$

(where "&" represents an AND operation and "|" represents an OR operation), the mask processing of one scan line can be performed using AND and OR operations and the result of the above operation is stored in the register ct. Thus, the value of ct is simply written back into image memory. Actually, the process is repeated by using finite-length registers. Since, as described above, this method allows for mask processing of one scan line at a time using AND/OR operations, the process can be performed at a considerably high speed. FIG. 13A shows the image before the elimination of residual noise and FIG. 13B shows the image after the elimination of residual noise.

4. Connection of Vertically Disconnected Components

If a character intersects or contacts with a ruled line, a significant pixel component is removed by removal of the ruled line. As a result, the component, which was originally one character component, is divided into two or more parts, causing an error during character recognition. To avoid this, methods such as GIM are disclosed, in which, after ruled lines are removed, the distribution of character components is checked and any disconnected line segment is interpolated using a straight line and multidimensional function. However, these methods cannot be performed easily and quickly because they entail software implementation of many special processes, such as contour tracing, thinning, and approximation with multidimensional curves of black pixel components in order to accomplish the interpolation.

In addition, in terms of character recognition, there is a problem that a disconnection of a character component may cause errors recognition. Generally, character recognition is based on characteristic quantities extracted from the boundary between character components and the background. If a character is disconnected, the number of character components increases or a contour vector is produced in a direction in which it does not actually exist. Although the degree of effectiveness may somewhat vary depending on approaches used, these problems would significantly be reduced if the character component is not disconnected. Therefore, rather than aiming at the precise reproduction of the original image, a process is performed based on the concept that it is enough that disconnected character components which are originally one character component are restored as one component in terms of connectivity after the removal of ruled lines. A simple and fast processing method for implementing this concept will be described below.

Figure 15:
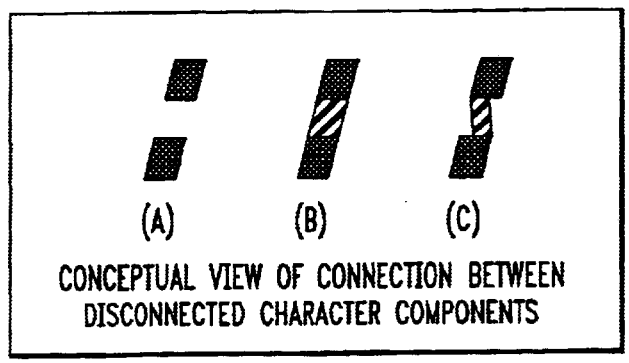
FIGS. 15A through 15C are diagrams for explaining the concept of connecting disconnected character components.

A removed ruled line portion has a substantially constant height on the image if the thickness of the ruled line is constant. After removal of the ruled line, black pixels remain above and below the removed ruled line as valid character components. A mask having a height of m pixels and a width of 1 pixel is provided to fill the center portion of the mask with a black pixel, if it contains a white pixel and black pixels exist above and below it. For example, if m is 7, a mask as shown in FIG. 14 can be used to connect vertically disconnected components. In the figure, "x" represents the pixel to be processed and "*" represents a pixel involving in the determination of "x." In the mask shown in FIG. 14, if one of the pixels at the upper * positions is a black pixel and one of the pixels at the lower * positions is also black pixel, then the pixel located at the center x is replaced with a black pixel. Thus, the disconnected character portions can be connected as shown in FIG. 15C (which will be described later).

In FIG. 14, the first, second, third, fourth (center), fifth, sixth, and seventh scan lines are assigned to multi-bit-length registers (variables) top3, top2, top1, ct, bot1, bot2, and bot3, respectively, and data of corresponding one scan line is loaded in to the respective registers. By the operation:

$$ct = ct | ((top3 | top2 | top1) \& (bot1 | bot2 | bot3))$$

(where "&" represents an AND operation and "|" represents an OR operation), the mask processing of one scan line can be performed using AND and OR operations and the result of the above operation is stored in the register ct. Thus, the value of ct is simply written back into image memory. Although the mask shown in FIG. 14 has a width of only one pixel, the mask process can be performed at high speed by repeatedly processing, for example, 32 bits of data as a unit, which is one word of data in a particular CPU, because there is no correlation in the left and right directions.

Figure 16:
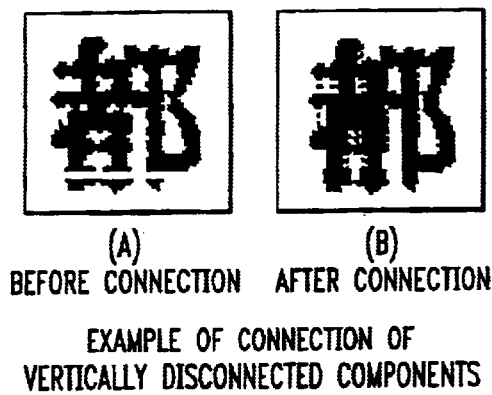
FIG. 16A shows the image before the connection of vertically disconnected components.
FIG. 16B shows the image after the connection of vertically disconnected components.

By applying the mask shown in FIG. 14 to each pixel location in sequence until the entire image has been covered, disconnected regions having a gap height up to 3 pixels (assuming that two or more black pixels continue above and below each of the regions) can be replaced with black pixels. The size (in pixels) of a white gap that is filled with black pixels at a time can easily be adjusted by simply changing the size of the mask in the vertical direction and modifying the operational expression accordingly. For example, the mask can be dynamically modified according to the thickness of a previously detected ruled line to process such line. The purpose of the connection of vertically disconnected components here is to connect all possibly disconnected portions at high speed by repeating the simple process until the entire image has been covered, without determining the local connectivity of pixels. For example, if a slant line segment is disconnected by the removal of a horizontal line as shown in FIG. 15A, this process does not intend to connect the disconnected parts with complete continuity as the hatched area in FIG. 15B. Rather, it is sufficient if portions above and below which black pixels exist are connected in the vertical direction as shown in FIG. 15C. As a matter of course, as can be seen in FIG. 16A, which shows an image before the connection, and FIG. 16B, which shows the image after the connection, excessive connections are made. Therefore, these excessive connections are removed at the next step.

5. Extraction of Character Portions Deleted by Ruled Line Removal

Figure 17:
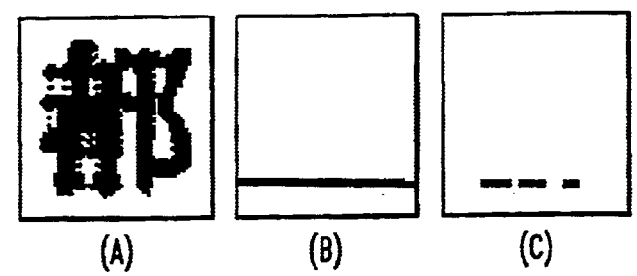
FIG. 17A shows the image after the connection of vertically disconnected components shown in FIG. 16B.
FIG. 17B shows the reproduction of removed black runs.
FIG. 17C shows the image after an AND operation between the images in FIG. 17A and FIG. 17B.

The image shown in FIG. 16B has resulted from the mask processing shown in FIG. 14. Regions that meet a predetermined criterion are filled with black pixels during the mask processing even if they originally contain no ruled line. These excessive connections can be removed and only required portion can be extracted by performing an AND operation between the image in FIG. 16B and the removed ruled line. Because the removed black runs longer than the threshold have been stored in a run-length table as in an example in FIG. 10, pixels can easily be reconstructed on the image according to the table. This process is described with reference to FIG. 17. First, a buffer having the same size as that of the original image is provided and the removed black run pixels are reconstructed (FIG. 17B). This image is ANDed with the image after connection of vertically disconnected components shown in FIG. 17A, pixel by pixel. As a result, only those portions that have been deleted by the ruled line removal and whose disconnected components have been connected will appear on the image, as shown in FIG. 17C. Since the AND operations are continuously performed word by word which can be processed by the CPU, the processing takes only a small amount of time on the order of memory access time, and therefore can be performed at high speed.

6. Restoration of Deleted Character Portions by Ruled Line Removal

FIG. 18A shows character image portions deleted by ruled line removal. This image is ORed with the ruled-line-removed image shown in FIG. 18B to produce an image in which the portion deleted by the removal of ruled lines is interpolated as shown in FIG. 18C. This process can be accomplished at high speed because it involves only the OR operation repeatedly performed on a word basis which the CPU can process, and therefore takes only a small amount of time on the order of memory access. Then, after the image shown in FIG. 18C is written back into the original image buffer, all the operations for the process of removing ruled lines and interpolation are completed.

7. Removal of Vertical Ruled Line

Figures 18, 19, 20:
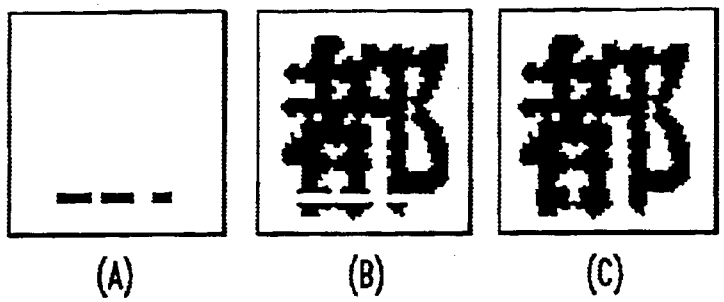
FIG. 19 shows an example of the image before the removal of vertical and horizontal ruled lines.
FIG. 20 shows an example of the image after the removal of vertical and horizontal ruled line.

The method of ruled line removal and interpolation has been described with respect to horizontal ruled lines. To remove vertical ruled lines besides horizontal ruled lines, an image after horizontal ruled lines are removed is rotated by 90 degrees, the processes described above are applied, then the processed image is rotated backward by 90 degrees. FIG. 19 shows an image before horizontal and vertical ruled lines are removed and FIG. 20 shows the image after horizontal and vertical ruled lines are removed. As can be seen in the final image shown in FIG. 20, some black noise pixels still remain after the removal of-ruled lines. It may be possible that a mask on the order of a 4×4 mask is used to reduce such pixels to make the image clearer. However, in terms of character recognition, such a small amount of residual noise causes no problem because it can be addressed on the part of a character recognition system.

8. Handling of Skew (Slant Image) and Blurred Spots

Figure 21:
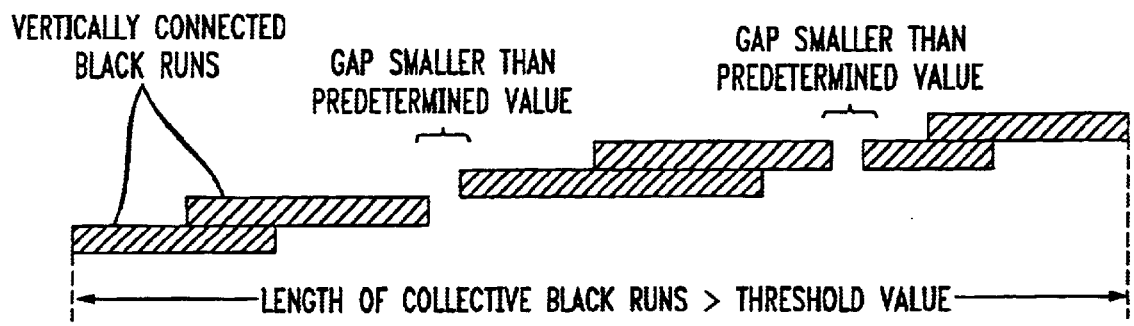
FIG. 21 is a diagram for explaining the handling of skew and blurred spots.

If an original image is skewed during capturing, ruled lines in the image are captured as skewed lines and portions of the ruled lines may not be completely removed by removal of ruled lines exceeding a threshold. In such a case, black runs which contact with each other in the vertical direction are considered to be one black run and, if the overall length of them in the aggregate exceeds a threshold, they are registered as a black run to be removed. In order to address a blurred spot, if a gap (disconnection) smaller than a predetermined value exists between two adjacent black runs, the two black runs are also deemed to be connected and are registered as a black run to be removed. This enables ruled lines containing a blurred spots to be removed. FIG. 21 shows an example of such black runs.

Figure 22:
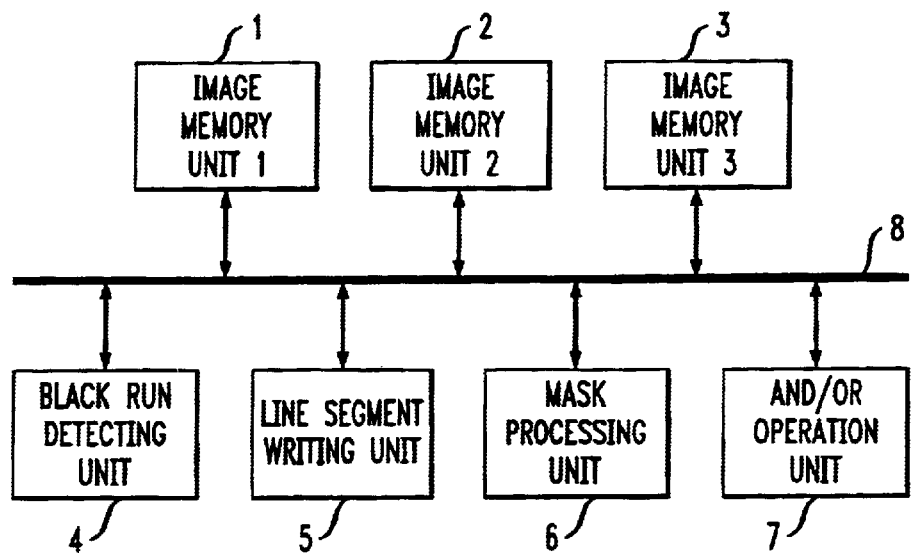
FIG. 22 is a block diagram showing the configuration of an example of the ruled line removing apparatus for performing the method of removing ruled lines according to the invention.

The method of removing ruled lines according to the present invention has been described. An example of an apparatus for implementing the ruled line removal method will be described below. FIG. 22 shows a block diagram of one example of the configuration of the apparatus for implementing the ruled line removal method according to the present invention. In FIG. 22, the apparatus for removing ruled lines according to the present invention comprises a first image memory unit 1, a second image memory unit 2, and a third memory unit 3 for storing an image to be processed or an image being processed, a black run detecting unit 4 for detecting black runs of horizontal ruled lines in an image by using a run-length lookup table and storing the detected black runs in a run-length table comprising values of the start point and the length from the starting point of the black runs for each vertical position, a line segment writing unit 5 for writing line segments into the image, an AND/OR operation unit 7 for performing AND/OR operations between images, interconnected through a bus 8.

It is to be appreciated that the functional units 4 through 7 and memory units 1 through 3 can be implemented in accordance with one or more computer-based processing devices (e.g., one or more CPUs or similar circuitry) and associated memory. Further, the methodologies of the invention may be implemented in accordance with one or more computer programs stored on machine readable medium that can be loaded and executed by one or more processing devices.

The first, second, and third memory units are used in implementing the ruled line removal method of the present invention as follows, by way of example. First, a sample image shown in FIG. 2 is stored in the first image unit 1. Then, an image shown in FIG. 3 which was obtained by removing black runs longer than a threshold is written over the image in the first image memory. Then, residual noise is eliminated from the image after the black run removal and the resulting image shown in FIG. 4 is written over the image in the first image memory unit. Connection of vertically separated components is performed on the residual noise removed image and the resulting image shown in FIG. 5 is stored in the second image memory 2. Then, the removed black runs restored in an image of the same size as the input image are stored in the third image memory unit 3. Then, the vertically-disconnected-component-removed image stored in the second image memory unit 2 is ANDed with the image of the removed black runs stored in the third image memory unit 3, pixel by pixel. The resulting image shown in FIG. 7 is written over the image in the second image memory unit 2. Then, the ruled-line-removed image stored in the first image memory unit 1 is ORed with the image resulting from the AND, pixel by pixel. The resulting image shown in FIG. 8 is written over the image in the first image memory unit 1, then the process completes. It can be seen that the method for removing ruled lines according to the invention can be implemented by using the three image memories with the operations described above. The process described above is one example and any change can be made to the order of storing images.

As apparent from the above description, according to the invention described above, the entire ruled line removal process can be performed at high speed by the steps of removing ruled lines using a run-length table, eliminating residual noise, connecting vertical disconnected components, and interpolating and restoring only the portion of a character that is deleted by the removal of the ruled lines, because most of these steps are accomplished by AND/OR operations which can be performed at a remarkably high speed even by a general purpose CPU. In addition, even when a ruled line intersects a character, the intersection which is removed by the removal of the ruled line can be restored uniformly and faster regardless of the complexity of the shape of the character.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of removing one or more ruled lines from an image having a character portion and ruled line portion, comprising the steps of:
    (a) detecting one or more scan direction continuous pixel sequences in the image and creating a run-length table managing the start point and run length information of the detected sequences;
    (b) removing one or more ruled lines from the image by eliminating the detected sequences longer than a predetermined length to create a ruled-line-removed image;
    (c) filling one or more gaps in the ruled-line-removed character image to create a gap-filled character image;
    (d) extracting portions of characters which are removed at step (b), from the gap-filled image; and
    (e) adding the portions of characters to the ruled-line-removed image to restore the character portions removed by the removal of the ruled lines.

2. The method of claim 1, wherein residual noise associated with the ruled line portions is removed before connecting separated components after the removal of the ruled line portion.

3. The method of claim 2, wherein the removal of the residual noise is accomplished by AND/OR operations using a mask comprising a subject pixel and pixels surrounding the subject pixel.

4. The method of claim 1, wherein the detection of sequences of the ruled line portions when creating a run-length table is implemented by horizontally reading pixels, eight pixels as a unit, in sequence based on a run-length lookup table comprising bit patterns, each of which represents a 1-byte numeric value of 0 to 255 assuming that the ruled line portion is a collection of black pixels or bit values of "1," start-point run-length values obtained for respective bit pattern, each of the values represents the length of a sequence of black pixels continuing from the least significant bit (2⁰ bit) to the left, and end-point run-length values obtained for respective bit pattern, each of the values represents the length of a sequence of black pixels continuing from the most significant bit (2⁷ bit) to the right, using the read eight pixels as a numeric value in said run-length lookup table to obtain the start-point run-length value and the end-point run-length value, and obtaining the horizontal start point and the length from the start point based on the obtained start-point and end-point run-length values.

5. The method of claim 1, wherein the removal of the ruled line portion is accomplished by writing white line segments on sequences longer than a predetermined length, by a process of writing "0," based on the run-length table assuming that the ruled line portion is a collection of black pixels or bit values "1."

6. The method of claim 1, wherein to accomplish the removal of the ruled line portion from the image, the predetermined length is set at a value about 1.5 to 2 times the width of a character.

7. The method of claim 1, wherein the filling of gaps is accomplished by AND/OR operations using a mask comprising a subject pixel and pixels adjacent to the subject pixel in one spatial direction.

8. The method of claim 1, wherein the extraction of the character portion removed by the ruled line portion is accomplished by an AND operation between the image in which the gaps are filled and the image in which the deleted ruled lines are restored.

9. The method of claim 1, wherein the restoration of the character portion is accomplished by an OR operation between the image obtained by the AND operation and an image after the removal of residual noise.

10. The method of claim 1, wherein ruled lines in a first spatial orientation are removed by applying the method and further wherein ruled lines in a second spatial orientation are then removed by rotating the image by d degrees and applying the method to the rotated image.

11. The method of claim 10, wherein the first spatial orientation is horizontal and the second spatial orientation is vertical.

12. A computer-based apparatus for removing one or more ruled lines from an image containing ruled line portions and character portions, the apparatus comprising:
   a ruled line detecting unit for detecting one or more scan direction continuous pixel sequences in the image and creating a run-length table managing the start point and run length information of the detected sequences;
   a line segment writing unit for removing sequences longer than a predetermined length;
   a mask processing unit for filling gaps caused by sequence removal in an image; and
   an AND/OR operation unit for performing an AND or OR operation between images pixel by pixel.

13. Apparatus for removing one or more ruled lines from an image having a character portion and ruled line portion, the apparatus comprising:
   at least one processing device operative to (i) detect one or more scan direction continuous pixel sequences in said image and create a run-length table managing the start point and run length information of the detected sequences; (ii) remove one or more ruled lines from the image by eliminating the detected sequences longer than a predetermined length to create a ruled-line-removed image; (iii) fill one or more gaps in said ruled-line-removed character image to create a gap-filled character image; (iv) extract portions of characters which are removed at the ruled line removal operation, from said gap-filled image; and (v) add said portions of characters to said ruled-line-removed image to restore the character portions removed by the removal of the ruled lines; and
   memory, coupled to the at least one processing device, for storing at least a portion of results associated with one or more of the operations.

14. The apparatus of claim 13, wherein residual noise associated with the ruled line portions is removed before connecting separated components after the removal of the ruled line portion.

15. The apparatus of claim 14, wherein the removal of the residual noise is accomplished by AND/OR operations using a mask comprising a subject pixel and pixels surrounding the subject pixel.

16. The apparatus of claim 13, wherein the detection of sequences of the ruled line portions when creating a run-length table is implemented by horizontally reading pixels, eight pixels as a unit, in sequence based on a run-length lookup table comprising bit patterns, each of which represents a 1-byte numeric value of 0 to 255 assuming that the ruled line portion is a collection of black pixels or bit values of "1," start-point run-length values obtained for respective bit pattern, each of the values represents the length of a sequence of black pixels continuing from the least significant bit (20 bit) to the left, and end-point run-length values obtained for respective bit pattern, each of the values represents the length of a sequence of black pixels continuing from the most significant bit (27 bit) to the right, using the read eight pixels as a numeric value in said run-length lookup table to obtain the start-point run-length value and the end-point run-length value, and obtaining the horizontal start point and the length from the start point based on the obtained start-point and end-point run-length values.

17. The apparatus of claim 13, wherein the removal of the ruled line portion is accomplished by writing white line segments on sequences longer than a predetermined length, by a process of writing "0," based on the run-length table assuming that the ruled line portion is a collection of black pixels or bit values "1."

18. The apparatus of claim 13, wherein to accomplish the removal of the ruled line portion from the image, the predetermined length is set at a value about 1.5 to 2 times the width of a character.

19. The apparatus of claim 13, wherein the filling of gaps is accomplished by AND/OR operations using a mask comprising a subject pixel and pixels adjacent to the subject pixel in one spatial direction.

20. The apparatus of claim 13, wherein the extraction of the character portion removed by the ruled line portion is accomplished by an AND operation between the image in which the gaps are filled and the image in which the deleted ruled lines are restored.

21. The apparatus of claim 13, wherein the restoration of the character portion is accomplished by an OR operation between the image obtained by the AND operation and an image after the removal of residual noise.

22. The apparatus of claim 13, wherein ruled lines in a first spatial orientation are removed by applying the apparatus operations and further wherein ruled lines in a second spatial orientation are then removed by rotating the image by d degrees and applying the apparatus operations to the rotated image.

23. The apparatus of claim 22, wherein the first spatial orientation is horizontal and the second spatial orientation is vertical.

24. An article of manufacture for removing one or more ruled lines from an image having a character portion and ruled line portion, comprising a machine readable medium containing one or more programs which when executed implement the steps of:
   (a) detecting one or more scan direction continuous pixel sequences in the image and creating a run-length table managing the start point and run length information of the detected sequences;
   (b) removing one or more ruled lines from the image by eliminating the detected sequences longer than a predetermined length to create a ruled-line-removed image;
   (c) filling one or more gaps in the ruled-line-removed character image to create a gap-filled character image;
   (d) extracting portions of characters which are removed at step (b), from the gap-filled image; and
   (e) adding the portions of characters to the ruled-line-removed image to restore the character portions removed by the removal of the ruled lines.

* * * * *

UNITED STATES PATENT AND TRADEMARK OFFICE
CERTIFICATE OF CORRECTION

PATENT NO. : 6,654,495 B1
DATED : November 25, 2003
INVENTOR(S) : Shin Katoh et al.

It is certified that error appears in the above-identified patent and that said Letters Patent is hereby corrected as shown below:

Column 6,
Line 56, delete "cats".

Column 14,
Line 50, please change "20 bit" to -- $2^0$ bit --.
Line 53, please change "27 bit" to -- $2^7$ bit --.

Column 16,
Line 6, please change "20 bit" to -- $2^0$ bit --.
Line 9, please change "27 bit" to -- $2^7$ bit --.

Signed and Sealed this

Eighteenth Day of May, 2004

JON W. DUDAS
*Acting Director of the United States Patent and Trademark Office*